(12) United States Patent  
Fricke et al.

(10) Patent No.: US 7,457,035 B2  
(45) Date of Patent: Nov. 25, 2008

(54) COMPOSITE LIGHT BASED ADJUSTMENT

(75) Inventors: Peter J. Fricke, Corvallis, OR (US); Timothy D. Emmerich, Corvallis, OR (US); Roshan B. Baliga, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 492 days.

(21) Appl. No.: 11/207,421

(22) Filed: Aug. 19, 2005

(65) Prior Publication Data

US 2007/0041092 A1    Feb. 22, 2007

(51) Int. Cl.  
  *G03B 21/56* (2006.01)

(52) U.S. Cl. .................... 359/443; 359/900; 353/79

(58) Field of Classification Search .............. 359/443; 353/29, 79  
See application file for complete search history.

(56) References Cited

U.S. PATENT DOCUMENTS

| | | | |
|---|---|---|---|
| 5,315,378 A | 5/1994 | Satou et al. | |
| 5,597,223 A * | 1/1997 | Watanabe et al. | ............. 353/97 |
| 5,907,437 A | 5/1999 | Sprotbery et al. | |
| 6,239,424 B1 * | 5/2001 | Kuo | ............................ 250/221 |
| 6,459,425 B1 | 10/2002 | Holub et al. | |
| 6,538,814 B2 | 3/2003 | Hunter et al. | |
| 6,727,489 B2 | 4/2004 | Yano | |
| 6,819,306 B1 | 11/2004 | Cooper | |
| 6,853,387 B2 | 2/2005 | Evanicky et al. | |
| 6,853,486 B2 * | 2/2005 | Cruz-Uribe et al. | ......... 359/443 |
| 7,185,987 B2 * | 3/2007 | Tamura | ....................... 353/42 |
| 2003/0179192 A1 | 9/2003 | Allen et al. | |
| 2004/0021939 A1 | 2/2004 | Kobayashi | |
| 2004/0196250 A1 | 10/2004 | Mehrotra et al. | |

* cited by examiner

*Primary Examiner*—Christopher Mahoney (57) ABSTRACT

Embodiments of sensing light are disclosed.

30 Claims, 3 Drawing Sheets

COMPOSITE LIGHT BASED ADJUSTMENT

BACKGROUND

Projection systems project images of light upon a screen. Ambient light may also be reflected off the screen which may result in reduced image quality.

DETAILED DESCRIPTION OF EXAMPLE EMBODIMENTS

Figure 1:
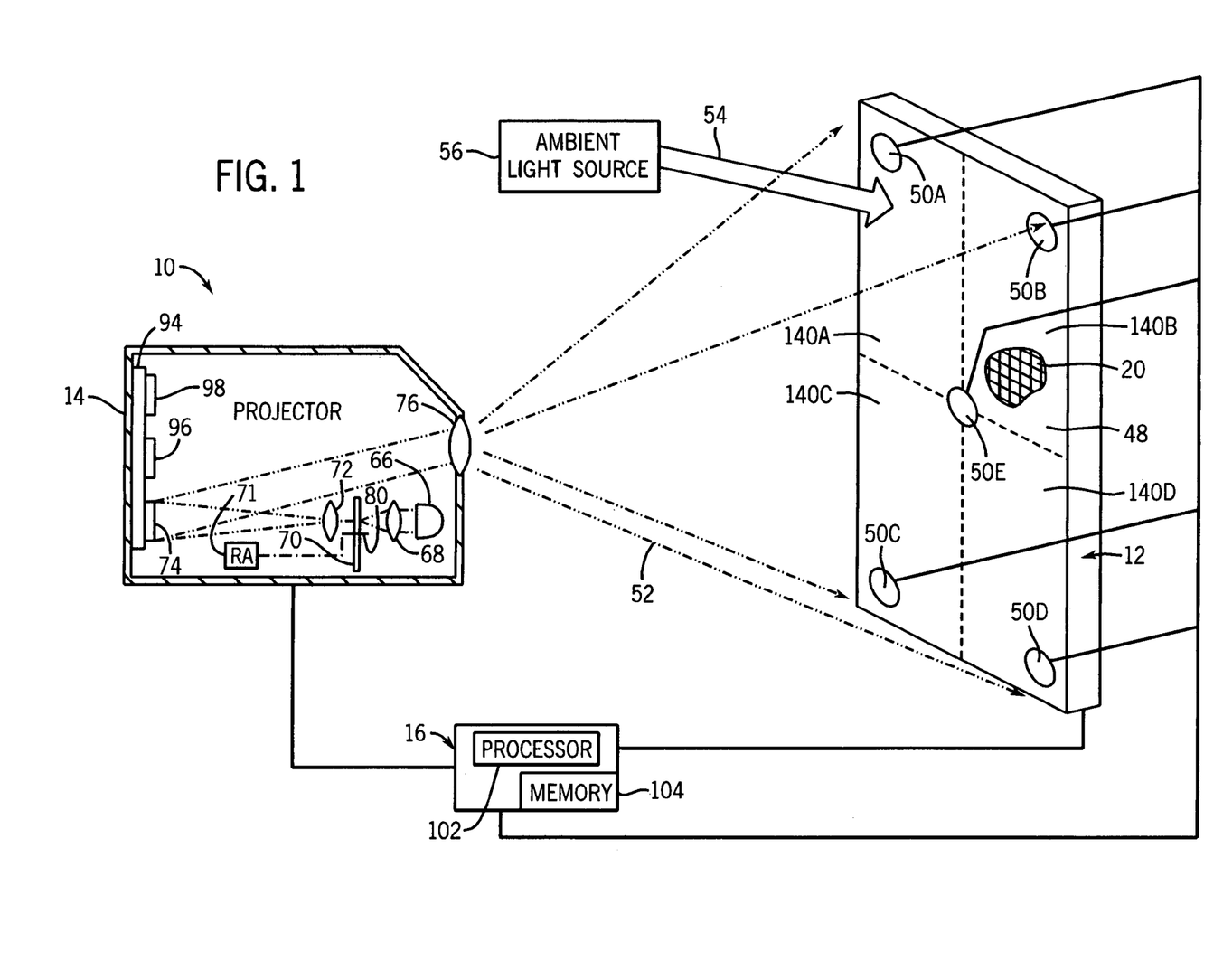
FIG. 1 is a schematic illustration of an embodiment of a projection system according to one example embodiment.

FIG. 1 schematically illustrates an embodiment of a projection system, such as projection system 10 which generally includes screen 12, projector 14 and controller 16. Screen 12 generally comprises a front projection screen configured to selectively reflect and absorb different amounts of light. In one embodiment, screen 12 includes a multitude of finite light-absorbing and reflecting portions referred to as screen pixels 20. In one embodiment, each pixel 20 is configured to selectively absorb and reflect light such that light reflected from pixel 20 has a wavelength or color that may vary with respect to light reflected from one or more adjacent pixels or clusters of pixels 20. In another embodiment, each of pixels may alternatively be configured to selectively reflect and absorb substantially over the spectrum of visible light. In still another embodiment, screen 12 may alternatively be configured as a single patch or pixel wherein substantially the entire area of screen 12 having the capability to selectively reflect and absorb different amounts of light actuates between different reflective or different absorbing states at substantially the same time.

Figure 2:
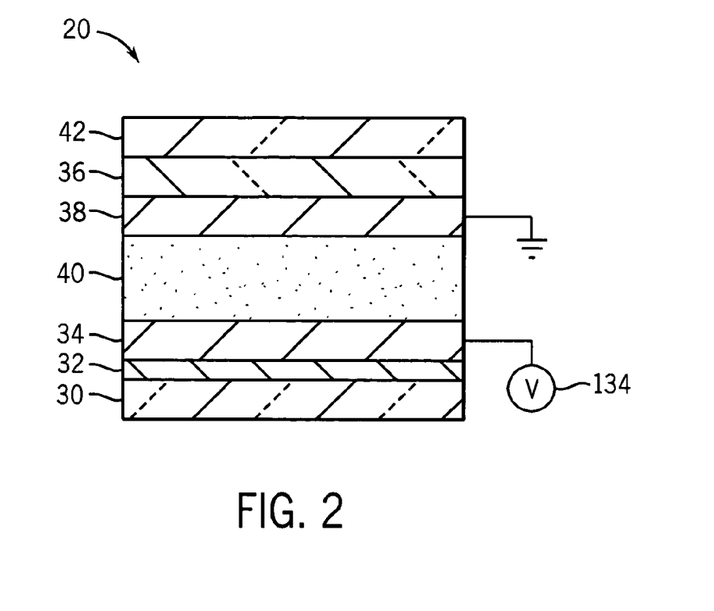
FIG. 2 is a fragmentary sectional of a portion of a screen of the system of FIG. 1 according to an example embodiment.

FIG. 2 schematically illustrates one example of an individual pixel 20 of screen 12. As shown by FIG. 2, in one embodiment, pixel 20 includes back substrate 30, reflective layer 32, electrode 34, substrate 36, electrode 38, optical responsive material 40 and coatings 42. Back substrate 30 serves as a support for reflective layer 32. In one embodiment, back substrate 30 comprises dielectric material such as silicon. In other embodiments, back substrate 30 may be formed from other materials such as glass and the like, including flexible (or plastic) substrates.

Reflective layer 32 comprises a layer of visible light reflecting material supported by back substrate 30. According to one example embodiment, layer 32 is formed from aluminum. In other embodiments, layer 32 may be formed from other materials such as silver or other thin metal coatings.

Electrode 34 comprises a layer of electrically conductive material configured to be electrically charged so as to apply electric field across electrically charged optical material 40. In the particular embodiment illustrated, electrode 34 is formed from transparent or translucent electrically conductive materials that overlie reflective layer 32. In one embodiment, electrode 34 may comprise a conductive material such as indium tin oxide (ITO) or polyethylene dioxythiophene (PEDOT). In other embodiments, electrode 34 may be formed from other transparent electrically conductive materials.

Front substrate 36 comprises a support structure for electrode 38. Front substrate 36 is formed from an optically transparent and clear dielectric material. In one embodiment, front substrate 36 may be formed from an optically clear and flexible dielectric material such as polyethylene terephalate (PET). In other embodiments, front substrate 36 may be formed from other transparent dielectric materials that may be inflexible such as glass.

Electrode 38 comprises a layer of transparent or translucent electrically conductive material formed upon substrate 36. Electrode 38 is configured to be charged so as to cooperate with electrode 34 to create an electric field across optically responsive material 40. In one embodiment, electrode 38 comprises a transparent conductor such as ITO or PEDOT. In other embodiments, other transparent conductive materials may be used. In the particular embodiment shown, electrode 34 is electrically connected to controller 16 while electrode 38 is electrically connected to ground. In other embodiments, this arrangement may be reversed. In still other embodiments, electrodes 34 and 38 may be charged to distinct voltages.

Optically responsive material 40 comprises a layer of material configured to change its transparency and reflectivity in response to an applied electrical field or charge. In one embodiment, material 40 may change from a transparent clear state, allowing light to pass through material 40 and to be reflected by reflective layer 32 to a generally opaque state in which light transmission is substantially attenuated by material 40. According to one example embodiment, material 40 may comprise a dichroic dye doped polymer dispersed liquid crystal (PDLC) material in which pockets of liquid crystal material are dispersed throughout a transparent polymer layer. In other embodiments, material 40 may comprise other materials such as electrochromic material, such as tungsten oxide, or photochromic or electrophoretic material.

Coatings 42 comprises one or more layers deposited or otherwise formed upon substrate 36 opposite to electrode 38. Coatings 42 may comprise a front plane diffuser and may include an anti-reflection layer such as anti-glare surface treatment, an ambient rejection layer, such as a plurality of optical band pass, or a series of micro lenses and/or partial diffuse layers. In other embodiments, coatings 42 may be omitted. In other embodiments, screen 12 may comprise other structures configured to flicker or modulate between two or more reflective states.

As further shown by FIG. 1, screen 12 additionally includes sensors 50A, 50B, 50C, 50D and 50E (collectively referred to as sensors 50). Sensors 50 comprise optical sensors on face 48 configured to be impinged by light which includes projected light 52 from projector 14 and ambient light 54 (referred to in discussion of some example of embodiments as composite light) from one or more ambient light sources 56. Ambient light sources 56 (schematically illustrated) may comprise overhead lighting in a room or environment, lamps, windows transmitting external light such as from the sun or other sources into the environment of system 10 or other sources of light by which the environment of system 10 is illuminated.

In the particular embodiment illustrated in FIG. 1, sensors 50 are located at spaced apart locations along face 48 of screen 12 so as to sense composite light at different locations along face 48 of screen 12. In the example shown, sensors 50a, 50b, 50c and 50d are located at opposite corners of face 48 while sensor 50E is located at a central or midpoint of face 48. As a result, sensors 50 may sense and detect variations in ambient light 54 across face 48. Although screen 12 is illustrated as including five sensors 50, screen 12 may alternatively include a greater or fewer number of such sensors. In one embodiment, screen 12 may make use of a single sensor 50.

According to one embodiment, sensors 50 are configured to sense the overall intensity of the composite light impinging face 48. In such an embodiment, sensor may comprise one or more sensors such as photodiodes (in some embodiments, additionally with optical filters) commercially available from industry. In yet another embodiment, sensors 50 may be configured to individually identify and sense component wavelengths of the composite light such as red light, green light and blue light. In such an embodiment, sensors 50 may comprise one or more photo sensors such as photodiodes (in some embodiments, additionally with optical filters) sensors commercially available from industry. In lieu of including a single sensor configured to individually identify and sense each of the components, red light, green light and blue light, screen 12 may alternatively include individual sensors, wherein each sensor is specifically configured to sense a particular component color, red light, green light or blue light, of the composite light. As will be described hereafter, in one embodiment, one or more of sensors 50 may also be configured to receive and sense ultraviolet or infrared light to facilitate communication between the screen and other devices such as projector 14.

An embodiment of a projector, such as projector 14 comprises a device configured to project light 52 upon face 48 of screen 12 so as to form an image upon face 48. In one embodiment, projector 14 is configured to form a color image upon face 48 of screen 12. In one particular embodiment, projector 14 is configured to sequentially project at least red, green and blue colors of light upon face 48 at a combined frequency of at least 50 hertz and up to 1,000 hertz or higher. Light 52 is reflected from face 48 for observation by viewers.

FIG. 1 illustrates one example of projector 14. As shown by FIG. 1, projector 14 may comprise a digital light processing (DLP) projector which generally includes light source 66, optics 68, color wheel 70, rotary actuator 71, optics 72, digital micromirror device (DMD) 74 and projection lens 76. Light source 66 comprises a source of light such as an ultra high pressure (UHP) arc lamp and reflector configured to emit light toward optics 68. In other embodiments, other sources of light may be used such as metal halide lamps and the like. Optics 68 are generally positioned between light source 66 and color wheel 70. Optics 68 condenses the light from source 66 towards DMD 74. In one embodiment, optics 68 may comprise a light pipe positioned between light source 66 and color wheel 70.

Color wheel 70 comprises an optic component configured to sequentially image color. Color wheel 70 generally comprises a disk or other member having a plurality of distinct filter segments positioned about the rotational axis 80 of the wheel and arranged such that light from optics 68 passes through such filter segments towards DMD 74. In one particular embodiment, color wheel 70 may include circumferentially arranged portions including red, green, blue, and white or clear. In another embodiment, color wheel 70 may include circumferentially arranged portions or segments corresponding to each of the three primary colors: red, green and blue. In yet another embodiment, color wheel 70 may include multiple segments of each of the primary colors. For example, color wheel 70 may include a first red segment, a first green segment, a first blue segment, a second red segment, a second green segment and a second blue segment. In still other embodiments, color wheel 70 may include other segments configured to filter light from light source 66 to create other colors.

Rotary actuator 71 comprises a device configured to rotatably drive color wheel 70 such that light from light source 66 sequentially passes through the filter segments. In one embodiment, rotary actuator 71 rotates color wheel 70 at a predetermined substantially constant speed. In another embodiment, rotary actuator 71 may be configured to rotate color wheel 70 at varying speeds based upon control signals received from processor 96. In one embodiment, rotary actuator 71 includes a motor and an appropriate transmission for rotating color wheel 70 at a desired speed. In other embodiments, rotary actuator 71 may comprise other devices configured to rotatably drive color wheel 70.

Optics 72 comprises one or more lenses or mirrors configured to further focus and direct light that has passed through color wheel 70 towards DMD 74. In one embodiment, optics 72 may comprise lenses which focus and direct the light. In another embodiment, optics 72 may additionally include mirrors which re-direct light onto DMD 74.

In one embodiment, DMD 74 comprises a semiconductor chip covered with a multitude of minuscule reflectors or mirrors which may be selectively tilted between "on" positions in which light is re-directed towards lens 76 and "off" positions in which light is not directed towards lens 76. The mirrors are switched "on" and "off" at a high frequency so as to emit a gray scale image. In particular, a mirror that is switched on more frequently reflects a light gray pixel of light while the mirror that is switched off more frequently reflects darker gray pixel of light. In this context "gray scale", "light gray pixel", and "darker gray pixel" refers to the intensity of the luminance component of the light and does not limit the hue and chrominance components of the light. The "on" and "off" states of each mirror are coordinated with colored light from color wheel 70 to project a desired hue of color light towards lens 76. The human eye blends rapidly alternating flashes to see the intended hue of the particular pixel in the image being created. In the particular examples shown, DMD 74 is provided as part of a DLP board 94 which further supports a processor 96 and associated memory 98. Processor 96 and memory 98 are configured to selectively actuate the mirrors of DMD 74. In one embodiment, processor 96 and memory 98 are also configured to control rotary actuator 71. In other embodiments, processor 96 and memory 98 may alternatively be provided by or associated with controller 16.

Lens 76 receives selected light from DMD 74 and projects the reflected light towards screen 12. Although projector 14 is illustrated and described as a DLP projector, projector 14 may alternatively comprise other projectors having other components configured such that projector 14 sequentially projects a series of colors towards screen 12 so as to form a visual image upon screen 12.

In yet another embodiment, projector 14 may comprise other forms of projectors. For example, in another embodiment, light source 66 may alternatively comprise one or more light-emitting diodes configured to selectively emit red, green and blue light. In such an embodiment, color wheel 70 and rotary actuator 71 may be omitted. In still another embodiment, projector 14 may alternatively include a Fabry-Perot interferometric device configured to reflect different colors or wavelengths of light depending upon a thickness of a selectively adjustable optical cavity. In such an embodiment, color wheel 70 and rotary actuator 71 may also be omitted. In still other embodiments, projectors 14 may have other configurations.

Controller 16 comprises a processing unit configured to generate control signals for actuating the one or more pixels 20 of screen 12 between different reflectivity states and for directing projector 14 to adjust projected light 52 based upon the composite light sensed by sensors 50. Controller 16 includes processor 102 and memory 104. Processor 102 comprises a processing unit. For purposes of the disclosure, the term "processor unit" shall include a conventionally known or future developed processing unit that executes sequences of instructions contained in memory 104. Execution of the sequences of instructions causes the processor 102 to perform steps such as generating control signals.

Memory 104 is associated with processor 102 and comprises a computer readable medium providing instructions for sensing the composite of light including projector light 52 and ambient light 54 and for generating control signals based upon the sensed composite light. Memory 104 may comprise a random access memory (RAM) for execution by the processor 102 from a read only memory (ROM), a mass storage device, or some other persistent storage. In other embodiments, hard wired circuitry may be used in place of or in combination with software instructions to implement the functions described. Although controller 16 is illustrated as a component separate from screen 12 and projector 14, in particular embodiments, controller 16 may be integrated as part of screen 12. In still other embodiments, controller 16 may be integrated as part of projector 14, potentially integrated with processor 96. Controller 16 is not limited to any specific combination of hardware circuitry and software, nor to any particular source for the instructions executed by the processing unit.

Figure 3:
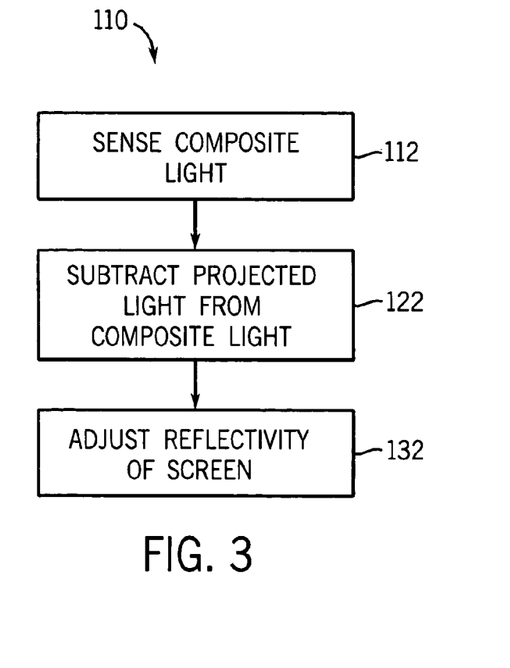
FIG. 3 is a flow diagram of an example process that may be carried out by the projection system of FIG. 1 according to an example embodiment.

FIG. 3 is a flow diagram illustrating one example process 110 carried out by controller 16 of system 10 (shown in FIG. 1). In step 112, controller 16 generates control signals directing sensors 50 to sense composite light which includes both projected light 52 and ambient light 54 (shown in FIG. 1). Sensors 50 may continuously, repeatedly, or periodically sense composite light during operation and may periodically, repeatedly, or continuously transmits signals to controller 16 representing the sensed composite light during operation. In one embodiment, signals representing the sensed composite light may be communicated to controller 16 via physical wires. In other embodiments, signals representing the sensed composite light may be communicated to controller 16 wirelessly such as through ultraviolet or infrared signal carriers. In other embodiments in which system 10 is to perform the process illustrated in FIG. 3, controller 16 may be integrated as part of or connected to screen 12 without communication between controller 16 or screen 12 with projector 14.

Figure 4:
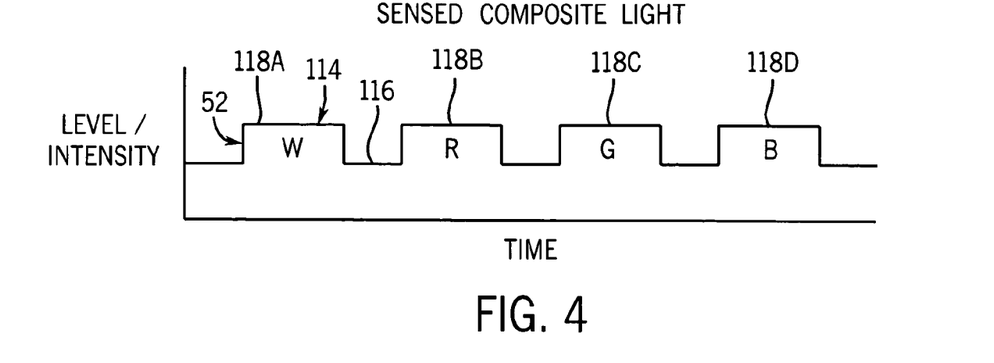
FIG. 4 is a graph illustrating one example of sensed composite light according to one example embodiment.

FIG. 4 is a graph illustrating one example of the composite light sensed by one or more of sensors 50 over time. As shown by FIG. 4, the composite light 114 generally has a baseline 116 and a series of pulses 118A, 118B, 118C and 118D (collectively referred to as pulses 118). Pulses 118A-118D generally correspond to the pulses of white, red, green and blue light 52, respectively, projected by projector 14 over time. Baseline 116 generally corresponds to those periods of time in which projector 14 is not projecting light or is projecting light with a reduced intensity. Although composite light 114 has been described as including white, red, green and blue pulses 118 in the noted order, the order of pulses 118 may be varied depending upon the order or sequence at which pulses of color light is projected by projector 14.

As shown by FIG. 3, upon sensing composite light 114 (shown in FIG. 4), processor 102, following instructions contained in memory 104, subtracts projected light 52 from composite light 114. According to one embodiment, processor 102 determines an amplitude of one or more pulses 118 (which corresponds in time to projected light) from the peak of pulses 118 to determine the intensity level of baseline 116. In yet another embodiment, baseline 116 can be determined by the average of the intensities measured during times when projector 14 is not projecting light. In yet another embodiment, controller 16 may receive data from projector 14 indicating the intensity of projected light 52, wherein processor 102 subtracts the intensity of projected light 52 from sensed peak intensities of pulse 118 to arrive at the intensity of baseline 116. The intensity of baseline 116 generally corresponds to ambient light 54 that is impinging face 48 of screen 12 from the sources of ambient light present.

As shown by FIG. 3, in step 132 processor 102 (shown in FIG. 1), following instructions contained in memory 104, generates control signals to adjust the reflectivity of face 48 of screen 12 based upon the composite light 114 (shown in FIG. 4) less projected light 52 (corresponding to baseline 116 in FIG. 4). In particular, processor 102 generates control signals causing voltage source 134 (shown in FIG. 2) to apply a predetermined voltage to electrode 34 so as to create an electric field across material 40 to appropriately actuate material 40 to a desired transmissive state in which a desired percentage of light is absorbed by material 40 and a desired percentage of light is permitted to pass through material 40 and to be reflected off of reflector 32.

In the particular embodiment illustrated in FIG. 1 in which screen 12 includes a matrix of pixels 20, processor 102 generates distinct control signals to individual pixels 20 so as to actuate the individual pixels 20 to distinct reflectivities based upon different levels of projected light 52 and ambient light 54 impinging face 48 at different regions or areas of face 48. For example, sensors 50A, 50B, 50C and 50D located in regions 140A, 140B, 140C and 140D, respectively, of face 48 (shown in FIG. 1) may sense different levels of projected light 52 as well as different levels of ambient light 54. Processor 102 generates control signals to appropriately adjust the reflectivity of pixels 20 associated with each of regions 140A-140D.

According to one embodiment in which substantially the entire area of face 48 comprises a single pixel 20, substantially the entirety of face 48 of screen 12 is actuated to a desired reflectivity. Overall, because system 10 adjusts the reflectivity of the one or more pixels 20 of screen 12 based upon the composite light less the sensed projected light, rather than sensing ambient light that has been reflected from screen 12 or sensing ambient light prior to impinging screen 12, such adjustment of the reflectivity of pixels 20 may be more accurate. As a result, system 10 may achieve image contrast and image quality that is better than would be achieved without using this technique.

In one embodiment, controller 16 additionally synchronizes or phase locks screen 12 and projector 14. In particular, controller 16 adjusts the actuation of screen 12 to different reflectivity states using a phase locked loop to remove inherent delays that may exist between the projection of light by projector 14 and actuation of the one or more pixels 20 of screen 12. For example, upon projecting a red light, projector 14 or controller 16 may generate a control signal to actuate one of pixels 20. Receipt of the signal and completion of the actuation of the pixel 20 to a new reflective state may inherently be delayed. In a scenario in which phase lock is employed, controller 16 transmits control signals to screen 12 earlier in time to accommodate such delays such that pixels 20 actuate to the desired reflectivity state in time with the projection of light by projector 14.

Figure 5:
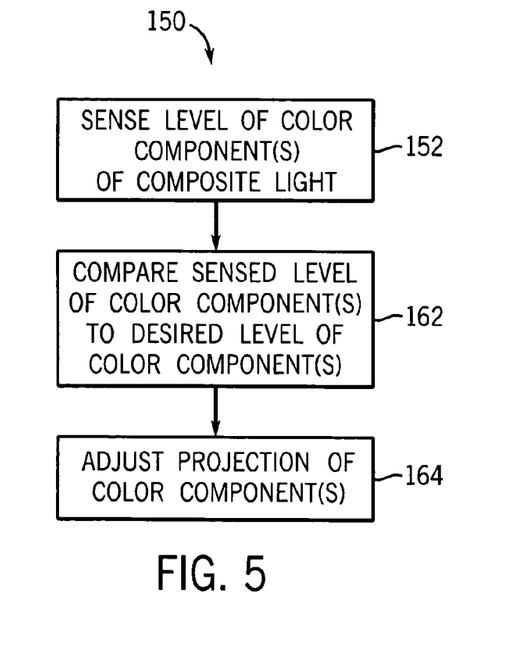
FIG. 5 is a flow diagram illustrating another example process that may be performed by the system of FIG. 1 according to an example embodiment.

FIG. 5 illustrates another example operation or process 150 that may be performed by system 10. The process outlined in FIG. 5 is to be carried out by an embodiment of system 10 in which one or more of sensors 50 are specifically configured to sense color components (red, green, blue) of composite light 52 and in which projector 14 is in communication with controller 16 and/or screen 12 via hardwired circuitry, wires or wireless communication. As shown by FIG. 5, in step 152, sensors 50 sense at least one color component (red light, green light or blue light) of composite light which includes projected light 52 and ambient light 54. In one embodiment, each individual sensor 50 is configured to sense each of red, green and blue lights. In yet another embodiment, each sensor 50 includes multiple individual components configured to sense the different color components.

Figure 6:
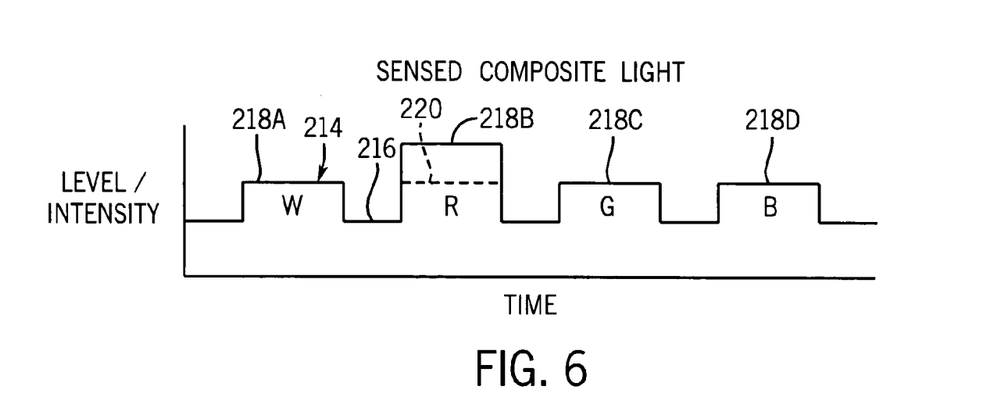
FIG. 6 is a graph illustrating another example of sensed composite light according to an example embodiment.

FIG. 6 is a graph illustrating one example of sensed composite light 214 over time. As shown by FIG. 6, composite light 214 includes baseline 216 and pulses 218A, 218B, 218C and 218D (collectively referred to as pulses 218). Pulses 218 correspond to the periodic projection of white light and color components (red light, green light and blue light), respectively, by projector 14 (shown in FIG. 1). Baseline 216 generally corresponds to light not directly originating from projector 14 that is sensed by one or more of sensors 50. Baseline 216 generally corresponds to ambient light from surrounding environmental light sources, schematically illustrated as ambient light source 56 in FIG. 1. In the example scenario shown in FIG. 6, pulse 218B has a peak intensity greater than the peak intensity of pulses 218A, 218C and 218D. This may be the result of ambient light source 56 providing light that has a greater percentage of the red component light, such a light source like the sun, or may be the result of projector 14 unintentionally projecting light having a larger red component intensity due to aging of one or more components of projector 14, environmental factors affecting projector 14, such as condensation, or miscalibration of projector 14. In other scenarios, the sensed composite light 214 may alternatively include pulses 218C or 218D, corresponding to green or blue light, respectively, which have higher or lesser than desired intensity levels.

As shown by FIG. 5, in step 162, processor 102, following instructions contained in memory 104, compares sensed color components (red light, green light, blue light) to a desired level of color components. The desired level of color components, such as the level of red light, the level of green light or the level of blue light in composite light 52, may be provided to processor 102 by projector 14. In the example shown in FIG. 6, the level of green light and blue light in composite light 214 as represented by the peaks of pulses 218C and 218D, respectively, is at a desired level. However, in the example shown in FIG. 6, the sensed level of red light as indicated by the peak of pulse 218B is greater than a desired level 220 of red light of composite light 214 as provided by projector 14. In other scenarios, the sensed level of red light may alternatively be less than a desired level of red light in composite light 214. Likewise, the sensed level of green light or blue light may also be greater than or less than a desired level of such light in composite light 214.

Figure 7:
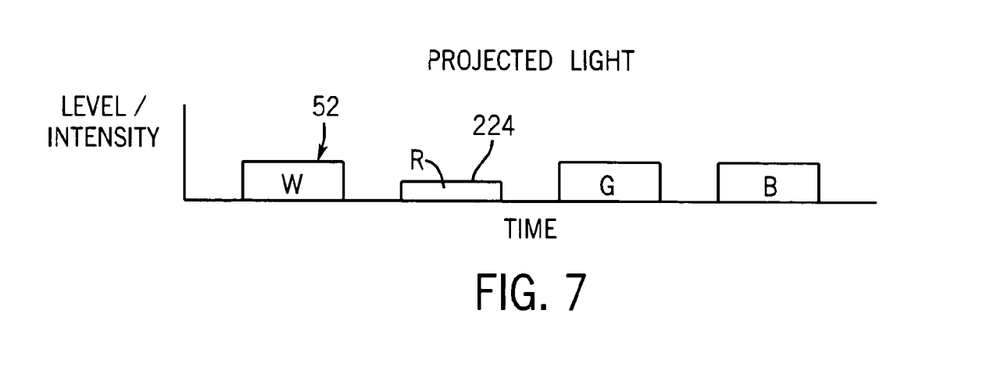
FIG. 7 is a graph illustrating adjustment of projected light to compensate for the sensed composite light of FIG. 6 according to an example embodiment.

As shown by FIG. 5, in step 164, processor 102 generates control signals which are communicated to projector 14 and which direct projector 14 to adjust the projection of one or more of the color components (red, green, blue) based upon the comparison of the sensed level of color components with the desired level of color components. FIG. 7 is a graph illustrating projected light 52 after light 52 has been adjusted to compensate for the excessive red component light sensed by sensors 50 and shown in FIG. 6. As shown in FIG. 7, processor 102 generates control signals directing projector 14 to project a level 224 of red light less than the desired level 220 of red light to compensate for the excessive red light at screen 12 as detected by one or more of sensors 50.

In the embodiment shown in FIG. 1 in which projector 14 is illustrated as a DLP projector, processor 102 may generate control signals causing the individual mirrors of DMD 74 to be actuated to the "off" positions for a greater percentage of time during the time at which light from light source 66 is passing through the red filter segment of color wheel 70. As a result, the level of red light projected by projector 14 is reduced to bring the actual level of red light at screen 12 to the desired level 220 (shown in FIG. 6). In yet another embodiment, processor 102 may generate control signals directing light source 66 of projector 14 to be underdriven so as to emit a lesser intensity of light during times at which the light is to pass through the red segment of color wheel 70. In yet other embodiments in which light source 66 includes one or more light-emitting diodes, processor 102 may be configured to generate control signals causing red light emitting diodes to be on for a lesser percentage of time or to be lit at a lesser intensity.

Alternatively, to adjust actual levels of red light at screen 12 which are less than the desired level of red light to be projected by projector 14, processor 102 may generate control signals causing projector 14 to project red light at a higher level or intensity as compared to the existing level of red light being projected which resulted in a shortage of component red light at face 48 of screen 12. For example, in the embodiment shown in which projector 14 includes a DMD 74, processor 102 may generate control signals causing the mirrors of DMD 74 to be in the "on" positions for a larger percentage of time during which light is passing through the red color filter segment of color wheel 70. In other embodiments, processor 102 may be configured to generate signals causing light source 66 to be overdriven or to emit light at a greater intensity during time at which light is to pass through the red filter segment of color wheel 70. In those embodiments in which projector 14 omits color wheel 70 and includes a light source 66 having one or more light-emitting diodes, processor 102 may be configured to generate control signals causing the red light-emitting diodes to emit a greater intensity of red light or to emit red light for a longer period of time. Processor 102 may be configured to generate control signals causing similar adjustments when the level or intensity of green or blue light is greater than or less than a desired level of green light or blue light.

Overall, in the embodiment in which system 10 is additionally configured to perform the process outlined in FIG. 5, system 10 may provide real-time calibration of projector 14 such that the proper levels of red, green and blue light are projected by projector 14 so as to result in the desired level of red, green and blue light impinging upon face 48 of screen 12. Because the level of red, green and blue light projected by projector 14 is adjusted based upon the level of red, green and blue light and the composite light impinging upon screen 12, such adjustment addresses variation due to varying ambient light conditions in addition to that due to the operation of projector 14. In those embodiments in which screen 12 includes multiple sensors 50 located at distinct regions 140A-140D, system 10 may differently adjust the projection of red, green and blue light at each of the regions to ambient lighting conditions that may exist at each of regions 140A-140D. As a result, system 10 may provide improved image quality under various ambient lighting conditions and under operation variations of projector 14.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. An apparatus comprising:
    a screen;
    at least one light sensor on the screen configured to be impinged by light including projected light and ambient light; and
    a controller configured to generate a control signal using an intensity of the light less an intensity of the projected light.

2. The apparatus of claim 1, wherein a reflectivity of the screen is adjusted in response to the control signal.

3. The apparatus of claim 1, wherein the projected light includes pulses of projected light having a first amplitude and wherein the controller generates the first control signals by subtracting the first amplitude from a second amplitude of the light.

4. The apparatus of claim 3, wherein the sensor is configured to sense the first amplitude of the pulses of projected light and the second amplitude of the light.

5. The apparatus of claim 3, wherein the controller is configured to receive the intensity of the projected light from a source of the projected light.

6. The apparatus of claim 3, wherein the pulses of light have a color and wherein the first sensor is configured to identify and sense the color apart from other colors.

7. The apparatus of claim 3, wherein the pulses of light include pulses of red light, green light and blue light and wherein at least one sensor is configured to individually identify and sense each of the red light, green light and blue light.

8. The apparatus of claim 7, wherein the controller is configured to identify levels of at least one of red light, green light and blue light in the light.

9. The apparatus of claim 8, wherein the controller is configured to generate second control signals for adjusting the projected light based upon the identified levels of the at least one of the red light, the green light and the blue light in the light.

10. The apparatus of claim 9 further comprising a projector configured to project the projected light at the screen.

11. The apparatus of claim 10, wherein the projector adjusts projection of the projected light in response to the control signals.

12. The apparatus of claim 11, wherein the projector is configured to project a light having a color, wherein the sensor is configured to identify and sense the color of the light apart from other colors, wherein the sensor is configured to sense the level of the color as a component of the light and wherein the projector is configured to adjust the level of the color in the projected light based upon the sensed level of the color in the light.

13. The apparatus of claim 10, wherein the reflectivity of the screen is adjusted in response to the first control signals, wherein the controller is configured to generate second control signals based upon composite light less the projected light and wherein projection of the projected light by the projector is adjusted in response to the second control signals.

14. The apparatus of claim 10, wherein the projector is configured to communicate to the controller a projection time where pulses of the projected light are projected by the projector and wherein the controller is configured to determine a spacing of the screen from the projector based upon the projection time and a time at which the pulses are sensed by the sensor.

15. The apparatus of claim 1, wherein the face of the screen includes portions having reflectivities that are independently adjustable, wherein each portion includes a light sensor and wherein the reflectivity of the portions are adjusted independently of one another in response to the control signals.

16. The apparatus of claim 1, wherein the controller is configured to generate the control signals at a frequency of at least 50 Hz.

17. The apparatus of claim 1, wherein the controller generates the first control signals based upon images to be projected by the projector.

18. An apparatus comprising:
    a screen;
    means for sensing a light including projected light and ambient light impinging the screen; and
    means for generating control signals using an intensity of the light less an intensity of the projected light.

19. The apparatus of claim 18, wherein the control signals are configured to adjust a reflectivity of the screen.

20. The apparatus of claim 18, wherein the control signals are configured to adjust projection of projected light.

21. A computer readable medium comprising:
    instructions for sensing an intensity of light including projected light and ambient light impinging a screen; and
    instructions for generating a control signal using the intensity of the light less an intensity of the projected light.

22. A method comprising:
    sensing an intensity of light including projected light and ambient light impinging a screen;
    generating a control signal configured to adjust operation of at least one of a projector and the screen using an intensity of the light less an intensity of the projected light.

23. The method of claim 22 further comprising adjusting a reflectivity of the screen in response to the control signals.

24. The method of claim 22 further comprising adjusting projection of the projected light in response to the control signals.

25. The method of claim 22, wherein the projected light includes pulses having a first amplitude and wherein generating control signals includes subtracting the first amplitude from the light.

26. The method of claim 25 further comprising sensing the amplitude.

27. The method of claim 25, wherein the projected light includes pulses of red light, green light and blue light and wherein the method further comprises individually sensing each of the red light, the green light and the blue light.

28. The method of claim 27 further comprising determining a level of at least one of red light, green light and blue light in the ambient light.

29. The method of claim 22 further comprising:
   determining a level of one of red, green and blue light in the ambient light; and
   adjusting said one of the red, green and blue light of the projected light using the determined level.

30. The method of claim 22, wherein the screen includes portions having reflectivities that are independently adjustable and wherein the method further comprises:
   independently sensing the light including projected light and ambient light at each portion; and
   independently adjusting the reflectivity of each portion using the intensity of the light less the intensity of the projected light at each portion.

* * * * *

UNITED STATES PATENT AND TRADEMARK OFFICE
CERTIFICATE OF CORRECTION

PATENT NO. : 7,457,035 B2
APPLICATION NO. : 11/207421
DATED : November 25, 2008
INVENTOR(S) : Peter J. Fricke et al.

It is certified that error appears in the above-identified patent and that said Letters Patent is hereby corrected as shown below:

On the Title Page, Item (54) in "Title", line 1, delete "COMPOSITE LIGHT BASED ADJUSTMENT" and insert -- SENSING LIGHT --, therefor.

In column 1, in "Title", line 1, delete "COMPOSITE LIGHT BASED ADJUSTMENT" and insert -- SENSING LIGHT --, therefor.

Signed and Sealed this

Seventh Day of April, 2009

JOHN DOLL
*Acting Director of the United States Patent and Trademark Office*